US007178876B2

(12) United States Patent
Borgward et al.

(10) Patent No.: US 7,178,876 B2
(45) Date of Patent: Feb. 20, 2007

(54) BELT LOCK WITH FASTENING DEVICE

(75) Inventors: Matthias Borgward, Hamburg (DE); Henry Knop, Hamburg (DE); Gerhard Siebrand, Quickborn (DE); Eckhard Alpers, Nottendorf (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 10/503,407

(22) PCT Filed: Jan. 26, 2003

(86) PCT No.: PCT/EP03/00771

§ 371 (c)(1), (2), (4) Date: Nov. 23, 2004

(87) PCT Pub. No.: WO03/064222

PCT Pub. Date: Aug. 7, 2003

(65) Prior Publication Data
US 2005/0067878 A1 Mar. 31, 2005

(30) Foreign Application Priority Data
Feb. 1, 2002 (DE) .............................. 102 04 090

(51) Int. Cl.
*A62B 35/00* (2006.01)
*B60R 22/00* (2006.01)
(52) U.S. Cl. .................... 297/481; 280/801.1

(58) Field of Classification Search ............... 297/481; 280/801.1
See application file for complete search history.

(56) References Cited

U.S. PATENT DOCUMENTS

| 4,118,068 A | | 10/1978 | Föhl | |
|---|---|---|---|---|
| 4,132,434 A | * | 1/1979 | Takahashi et al. | 297/481 |
| 5,332,261 A | * | 7/1994 | Siepierski | 280/801.1 |
| 5,855,047 A | * | 1/1999 | Haas | 24/684 |
| 6,581,969 B2 | * | 6/2003 | Nishide | 280/801.1 |

FOREIGN PATENT DOCUMENTS

| DE | 199 44 478 | | 3/2001 |
|---|---|---|---|
| EP | 0 854 070 | | 7/1998 |
| JP | 405147499 A | * | 6/1993 |

* cited by examiner

*Primary Examiner*—Peter M. Cuomo
*Assistant Examiner*—Joseph Edell
(74) *Attorney, Agent, or Firm*—Robert W Becker & Associates; Robert W Becker

(57) ABSTRACT

A belt lock is provided and has a lock holder that is rotatably mounted on a vehicle part. A restoring spring, as a flat spiral spring, has spiral spring windings that are disposed in a single plane and are disposed between a cover and the lock holder. The spiral spring biases the lock holder into a rest position of the belt lock, and has one end supported against the lock holder and another end supported against the cover. The cover has a first radially extending extension for the outer end of the spring, and a second extension as a stop for restoring of the lock holder.

7 Claims, 3 Drawing Sheets

BELT LOCK WITH FASTENING DEVICE

BACKGROUND OF THE INVENTION

The invention relates to belt lock or buckle having a lock holder that is adapted to be mounted on a vehicle part, whereby the lock holder is provided with a hole for the extension therethrough of a fastening means, which is to be connected with the vehicle part, in such a way that the lock holder is rotatably held on the fastening means, and whereby a restoring spring having spirally disposed spring windings is arranged between the vehicle part and the lock holder, wherein the restoring spring biases the lock holder into the rest position of the belt lock, wherein one end of the spring is supported against the lock holder, and the other end is supported against the vehicle part.

A belt lock having the aforementioned features is described in EP 0 854 070 B1. So that the belt lock can move out of its rest position for setting an optimum belt path, the lock holder is rotatably mounted on a fastening bolt for the lock holder via a slot, whereby the slot also permits a translatory movement of the belt lock relative to the fastening means. To restore or reset the belt lock into its rest position, a spiral spring having a first helically embodied spiral portion is provided, the spring windings of which are disposed axially next to one another with the same diameter of the spring windings, and surround the fastening bolt. In addition, a second spiral portion is disposed between the first spiral portion and the end of the spring that is supported on the belt lock. Whereas the first spiral portion of the restoring spring strives for the restoring of the lock holder about its axis of rotation upon rotation of the lock holder about the fastening bolt, the second spiral portion effects the restoring of the lock after its translatory shifting.

The known belt lock has the drawback of a correspondingly large axial overall width of the fastening arrangement for the belt lock; furthermore, the second spiral portion, which is provided due to the translatory restoring of the belt lock, makes the dimensioning and manufacture of the restoring means complicated.

It is therefore an object of the invention to provide a straightforward restoring spring configuration for a belt lock having the aforementioned general features and to provide an effective restoring or resetting of the lock holder.

SUMMARY OF THE INVENTION

Pursuant to the basic concept of the invention, the restoring spring is a flat spiral spring having spring windings that are disposed in a single plane and are disposed between the lock holder and a cover as a counter-bearing, whereby the cover is provided with a first radial extension for the suspension of the outer end of the planar spiral spring, and with a second extension as a top for the restoring of the lock holder. In this connection, the invention involves the recognition that in addition to the restoring effect, about the axis of rotation extending through its center, of a spiral spring having spring windings disposed in a single plane and with a radius that increases towards the outside, there is a translatory displacement of the lock holder, with the inner end of the spiral spring suspended therein, the tangential movement of which is effected in the same manner as the tensioning of the spiral spring upon rotational movement of the lock holder about the fastening bolt, without a special spring profile having to be provided. Pursuant to the invention, the planar spiral spring is tensioned between the lock holder and an outer cover, so that the spring windings of the planar spiral spring cannot deflect. In addition, as a consequence of the expedient configuration of the cover with a stop for the restoring of the lock holder, and additional function of the cover is realized.

The invention has the advantage that the overall axial width of the fastening arrangement for the lock holder on the vehicle part is considerably reduced, since an installation space need be provided only for a planar spiral spring, in other words, in the order of magnitude of the material thickness of the spring wire that is generally used for the manufacture of the spiral spring. Furthermore, the endurance characteristic of the inventively utilized planar spiral spring is better than that of the helical spiral spring known from the state of the art.

Pursuant to one embodiment of the invention, the cover has a mounting opening allowing the fastening means to extend through, so that the cover is fixed in position, in particular in a non-rotatable manner, relative to the vehicle part, so that it is suitable as a counter-bearing for the restoring spring.

Pursuant to an embodiment of the invention, in addition to its securement via the fastening means, the cover is positively fixed in position on the vehicle part.

Pursuant to an embodiment of the invention, the outer end of the planar spiral spring is fixed in position on the cover, and the inner end of the planar spiral spring engages the lock holder.

To hold the outer end of the spiral spring, the cover can be provided with a first radial extension for the suspension of the outer end of the planar spiral spring, and with a second extension as a stop for the restoring or resetting of the lock holder.

To reliably fix the lock holder in the rest position of the belt lock on the vehicle part, a further, third radial extension can be disposed diametrically across from the second radial extension on the other side of the center line of the lock holder, so that in its rest position the lock holder is tensioned between the second and the third extension and is thus rotatable in only one direction of rotation.

The positive fixing of the cover provided pursuant to one embodiment of the invention can expediently be realized by providing the third extension with an opening for the extension therethrough of a pin disposed on the vehicle part.

One embodiment of the invention is shown in the drawings, which will be described subsequently and in which:

DESCRIPTION OF SPECIFIC EMBODIMENTS

Figure 1:
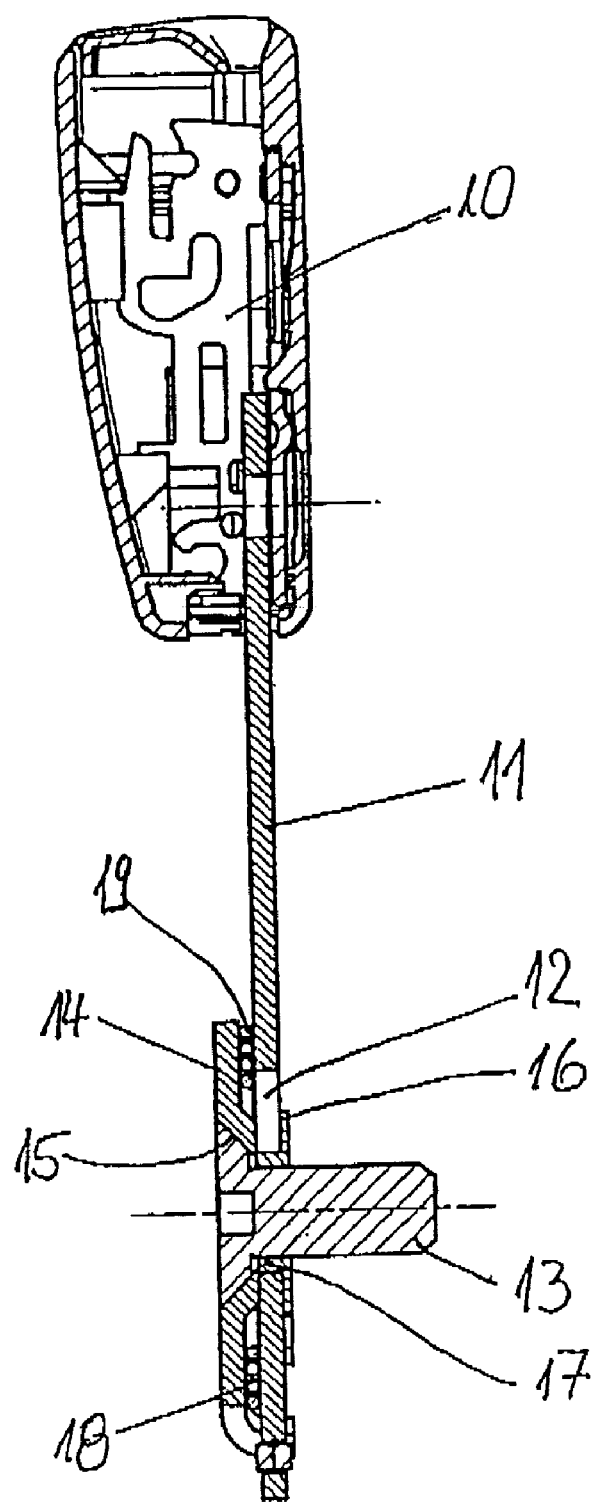
FIG. 1 is a cross-sectioned side view of a belt lock having lock holder and fastening means including a restoring spring.

As can be seen initially from FIG. 1, a belt lock or buckle 10 is fixedly connected with a lock holder 11, on that end of which that faces away from the belt lock 10 a slot 12 is provided to allow a fastening screw or bolt 13 to pass through, whereby the fastening bolt 13 can be tightened into a non-illustrated vehicle part as a carrier of the lock holder 11 having the belt lock 10. Provided on that side that faces away from the bolt shaft is a cover 14 that spans or covers the lower end of the lock holder 11 having the slot 12, which cover is provided with a mounting opening 15 having a countersunk portion for the head of the fastening bolt 13, so that the fastening bolt 13 is disposed in a flush manner in the cover 14. On the opposite side, a washer 16 is disposed on the shaft of the fastening bolt 13 and via a collar 17 extends into the slot 12 of the lock holder 11, so that the collar 17 of the washer 16 on the one hand serves as a rotary or pivot bearing for the lock holder 11, and on the other hand serves as a guide for the translatory displacement of the lock holder 11 having the slot 12 on the collar 17.

Disposed between the lock holder 11 and the cover 14 is a spiral spring 18 as a restoring spring, the windings 19 of which extend in a single plane with a radius that increases from the inside toward the outside; in this connection, the inner end of the spiral spring 18 is suspended on the lock holder 11, while the outer end of the spiral spring 18 is fixed on the cover 14.

Figure 2:
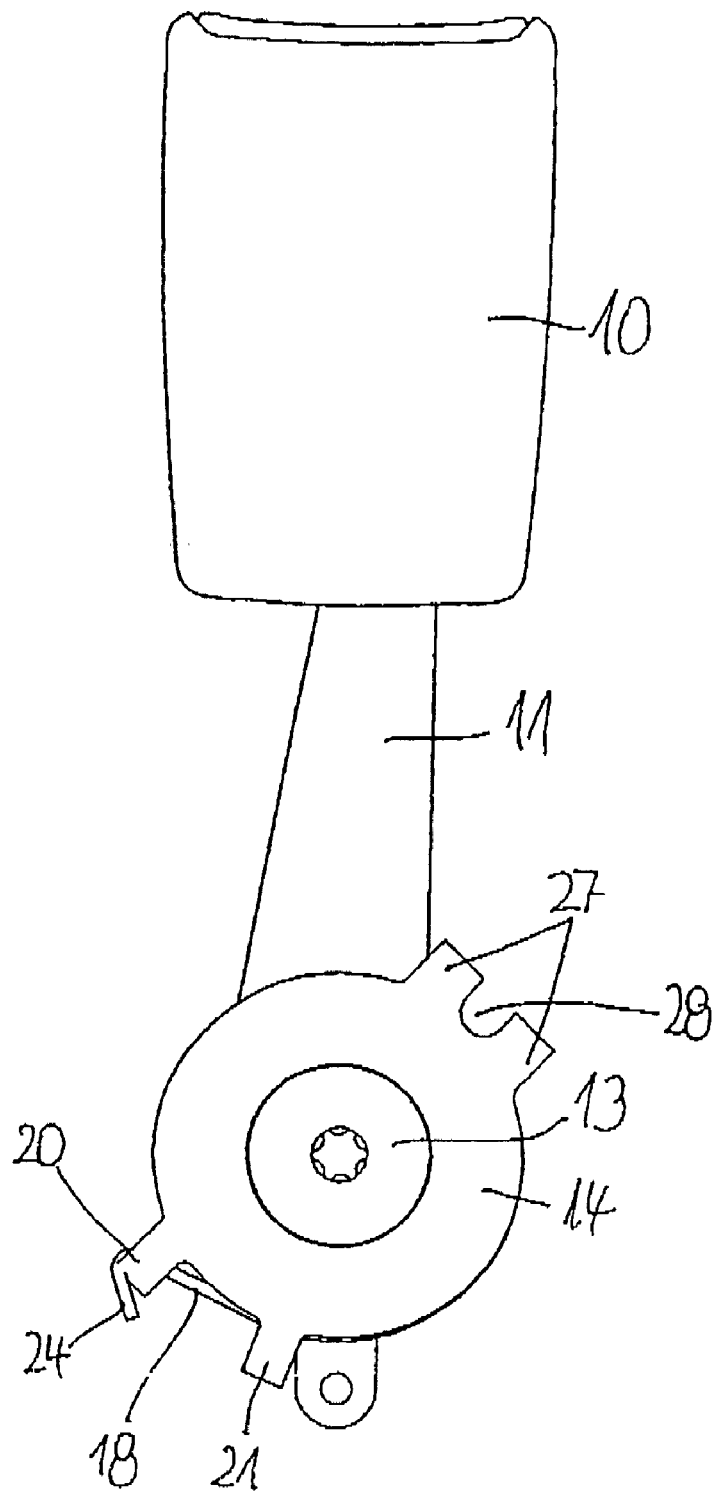
FIG. 2 is a front view of the subject matter of FIG. 1.
Figure 3:
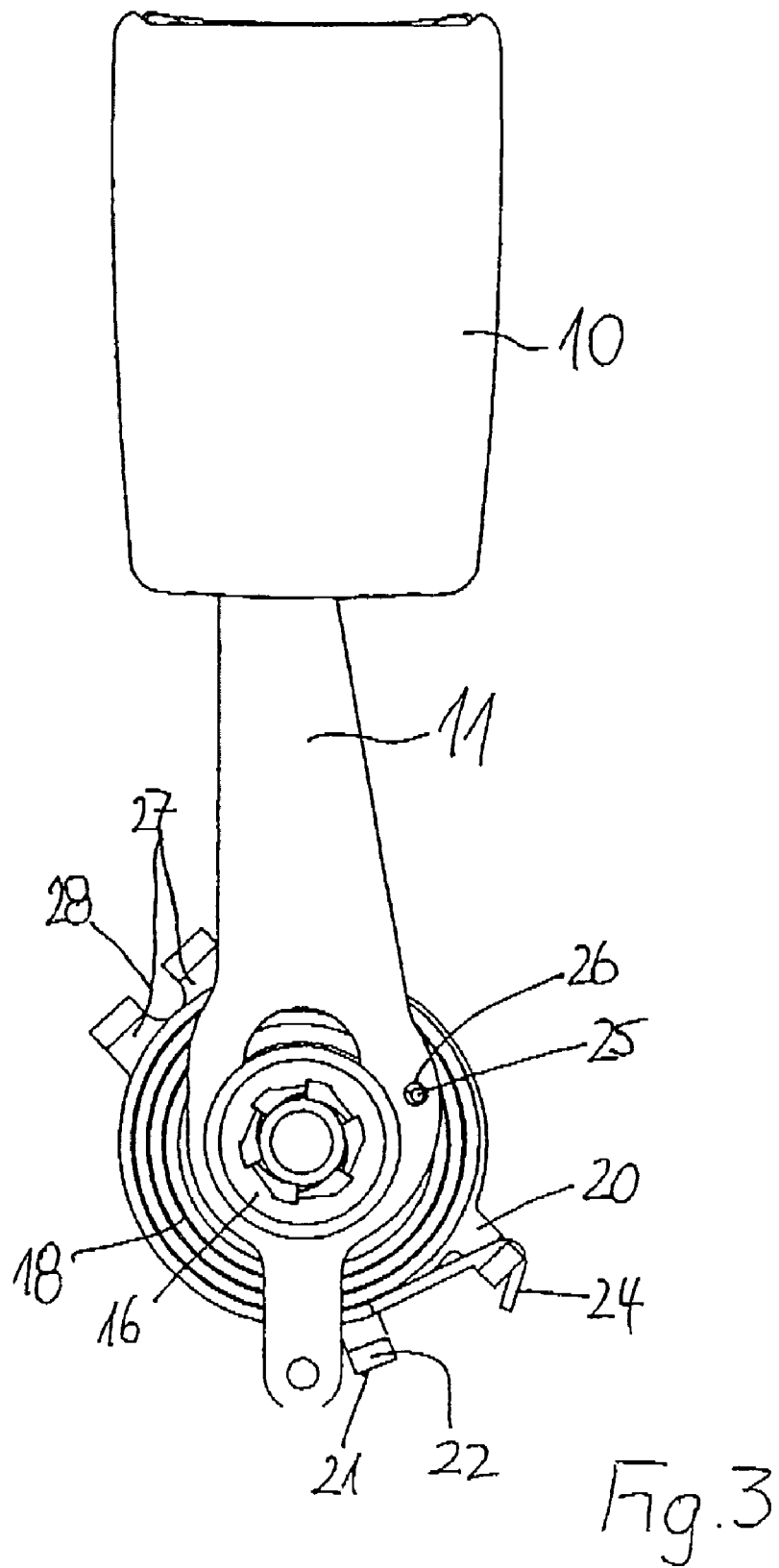
FIG. 3 is a rear view of the subject matter of FIG. 1.

As can be seen from FIGS. 2 and 3, the cover 14 has a first radial extension 20 for the suspension of the outer end 24 of the spiral spring 18, and furthermore has a second extension 21 as a stop for the restoring or resetting of the lock holder 11. For this purpose, the extensions or stops 20, 21 are provided with angled pieces 22 that extend into the plane of the lock holder 11. As can be seen in detail from FIG. 3, the inner end 25 of the spiral spring 18 is suspended in an opening 26 of the lock holder 11. Finally, a further, third radial extension 27 is disposed diametrically across from the second radial extension 21 on the other side of the center line of the lock holder 11; the third radial extension has an opening 28 to allow a pin or journal, which is disposed on the non-illustrated vehicle part and is also not illustrated, to extend through for the positive fixing of the cover 14 on the vehicle part. Thus, the lock holder 11 is held in its rest position between the second extension 21 and the third extension 27, and is pivotable in only direction of rotation.

Upon pivoting of the lock holder 11 about the axis of rotation represented by the fastening bolt 13, and about the collar 17 of the washer 16, the planar spiral spring 18 is tensioned, so that after termination of the pivoting movement, the lock holder 11 is, due to the tensioned spiral spring 18, pivoted back into its starting position. If the lock holder 11 having the slot 12 is shifted upon the collar 17 of the washer 16, the inner end of the planar spiral spring is shifted relative to the outer end of the planar spiral spring 18 that is fixed in position on the outer cover 14, so that the lock holder 11 is again moved back into its rest position by the deflected and hence tensioned inner end of the planar spiral spring 18.

The features of the subject matter of these documents disclosed in the preceding description, the patent claims, the abstract and the drawing can be important not only individually but also in any desired combination with one another for the implementation of the various embodiments of the invention.

The specification incorporates by reference the disclosure of German priority document 102 04 090.7 filed Feb. 1, 2002 and PCT/EP03/00771 filed Jan. 26, 2003.

The present invention is, of course, in no way restricted to the specific disclosure of the specification and drawings, but also encompasses any modification within the scope of the appended claims.

The invention claimed is:

1. A belt lock for use in a vehicle, comprising:
 a lock holder that is adapted to be mounted on a vehicle part, wherein said lock holder is provided with an elongated hole;
 a fastening means that is adapted to be connected to said vehicle part, wherein said fastening means extends through said hole of said lock holder in such a way that said lock holder is held displaceably in a rotatable and translatory manner on said fastening means;
 a restoring spring, in the form of a flat spiral spring, wherein said spiral spring biases said lock holder into a rest position of said belt lock, wherein said spiral spring has one end that is supported against said lock holder, and wherein said spiral spring has spiral spring windings that are disposed in a single plane; and
 a cover as a counter-bearing, wherein said cover is an outer cover that is pre-mounted on an exterior portion of said belt lock, wherein said spring windings are disposed between said cover and said lock holder, wherein said spiral spring has another, outer end that is supported against said cover, wherein said cover has a first radially extending extension for the support of said outer end of said spiral spring, and wherein said cover has a second radially extending extension as a stop for a restoring of said lock holder.

2. A belt lock according to claim 1, wherein said cover has a further, third radially extending extension that is disposed diametrically across from said second radially extending extension on an opposite side of a center line of said lock holder, and wherein said lock holder, in said rest position, is tensioned between said second radially extending extension and said third radially extending extension and is thus pivotable in only one direction of rotation.

3. A belt lock according to claim 2, wherein said third radially extending extension is provided with an opening for extension therethrough of a portion of said vehicle part that is disposed on said vehicle part for a positive fixing of said cover in position on said vehicle part.

4. A belt lock according to claim 1, wherein said cover is provided with a mounting opening for extension therethrough of said fastening means.

5. A belt lock according to claim 1, wherein said cover is non-rotatably secured relative to said vehicle part.

6. A belt lock according to claim 1, wherein said cover is positively fixed in position on said vehicle part.

7. A belt lock according to claim 1, wherein said one end of said spiral spring engages against said lock holder.

* * * * *